(12) United States Patent
Bouten

(10) Patent No.: US 6,816,226 B2
(45) Date of Patent: Nov. 9, 2004

(54) PLASTIC DISPLAY DEVICE WITH PERIPHERAL SEAL

(75) Inventor: Petrus Cornelis Paulus Bouten, Eindhoven (NL)

(73) Assignee: Koninklijke Philips Electronics N.V., Eindhoven (NL)

(*) Notice: Subject to any disclaimer, the term of this patent is extended or adjusted under 35 U.S.C. 154(b) by 0 days.

(21) Appl. No.: 10/477,890

(22) PCT Filed: May 15, 2002

(86) PCT No.: PCT/IB02/01685
§ 371 (c)(1),
(2), (4) Date: Nov. 19, 2003

(87) PCT Pub. No.: WO02/095491
PCT Pub. Date: Nov. 28, 2002

(65) Prior Publication Data
US 2004/0125320 A1 Jul. 1, 2004

(30) Foreign Application Priority Data
May 22, 2001 (EP) .......................... 01201926

(51) Int. Cl.[7] .................. G02F 1/1333; G02F 1/1339
(52) U.S. Cl. ...................... 349/158; 156/153
(58) Field of Search ................... 349/153, 155–156, 349/158

(56) References Cited

U.S. PATENT DOCUMENTS

| 4,391,491 A | * | 7/1983 | Freer et al. ............... 349/122 |
| 4,443,063 A | * | 4/1984 | Nishiyama ................ 349/154 |
| 5,499,127 A | * | 3/1996 | Tsubota et al. ........... 349/153 |

FOREIGN PATENT DOCUMENTS

| JP | 6028626 | 2/1985 |
| JP | 07020476 | 1/1997 |
| WO | 02095491 | 11/2002 |

* cited by examiner

Primary Examiner—Toan Ton

(57) ABSTRACT

A display device comprises a pair of plastic substrates (21, 22) which are bonded together by a peripheral seal (3), and comprises cell spacers (28, 29) to space the plastic substrates apart at an active area. At least one of the substrates is provided with a functional layer (23A, 23B, 24), while an electro-optical material is present between the substrates. The spacers (28, 29) are in the form of ribs or columns, i.e. they have substantially flat contact surfaces and the peripheral seal (3) has a height ($d_2$) of less than ¼ of the height ($d_1$) of the spacers ($d_2 \leq 0.25 d_1$). The line (3) preferably does not comprise spacers.

9 Claims, 2 Drawing Sheets

PLASTIC DISPLAY DEVICE WITH PERIPHERAL SEAL

FIELD OF THE INVENTION

The present invention relates to a display device comprising a pair of plastic substrates which are bonded together by a peripheral seal, and comprises cell spacers to space the plastic substrates apart at an active area, at least one of the substrates being provided with a functional layer, while an electro-optical material is present between the substrates.

BACKGROUND OF THE INVENTION

Display devices of this type, such as LEDs and liquid crystal display devices, have been known for some time. An electron-optical material, for instance, a liquid crystal material, is provided between a pair of substrates. At least one of the substrates is provided with a plurality of electrodes. Voltages applied to the electrodes govern the optical properties of the material. By correctly applying voltages to an array of elements and using illumination in the case of liquid crystal devices (either externally, including incident light or internally), an image may be produced. At least one of the substrates is provided with a functional layer such as conducting patterns, for instance ITO, electronic switching devices such as poly-silicon or amorphous silicon and/or permeation layers.

The image rendition, in particular the color rendition of the display device, is dependent, inter alia, on the distance between the substrates. To provide an accurate spacing between the substrates, spacers are used between the substrates.

Typically, the spacers are spherical balls mixed with the liquid crystal material. Up to now, glass substrates have been the most frequently used substrates for use in such devices, for instance, liquid crystal display devices.

When use is made of plastic substrates, the flexibility of the substrates allows application of the liquid crystal display device in situations where glass substrates are not or less suitable, for instance, when the display is to be applied to a curved surface or must be freely bendable.

However, the flexibility of the substrates themselves leads to a number of problems, for example, the image rendition may be poor and the functional layers are susceptible to failure due to bending or other causes. Such failure leads to malfunctioning or even destruction of the device.

SUMMARY OF THE INVENTION

It is an object of the invention to mitigate one or more of the above-mentioned problems.

To this end, the display device is characterized in that the spacers are in the form of ribs or columns, and the seal line has a height of less than ¼ of the height of the spacers.

For a proper image rendition, height variations, i.e. variations in the distance between the substrates at the active area, are to be minimized. Height variations are dependent, among other things, on the spacer density, i.e. the number of spacers per unit area. For flexible substrates, a number of problems occur. On the one hand, a relatively large density of spacers is required for small height variations, on the other hand, when using spherical spacers, the inventor has found that the required densities are so high that there is a large risk of clustering of spacers, which in itself may be a cause of height variations and of image intensity variations. Calculations show that when using column or rib spacers, the required density is substantially less and clustering does not occur, which substantially reduces the height and image intensity variations and thus improves the image quality. When the device is put under mechanical load e.g. pressure (which may happen when the device is bent, touched or is subjected to temperature differences) the maximum stress exerted by spherical spacers on the substrates (and thereby on the functional layers) is much higher than for rib or column spacers. Such high stresses may lead to the failure of the functional layers. Application of rib or column spacers thus adds to the mitigation of these problems. Within the scope of the invention, rib or column spacers are spacers in the form of ribs or columns, substantially flat at the contact areas, i.e. having a large radius of curvature at the contact areas with the substrates in respect of the height, i.e. at least five times the height.

It is logical to use a seal of roughly the same height and to use the same or similar spacers in the seal as those used in the active area. However, the inventor has realized that reducing the height to substantially less than ¼ of the height in the active area has a considerably advantage, for it reduces the permeation of gases or gas-like materials (such as water or oxygen) through the seal. These materials attack the functional layers and/or the LCD material itself, thereby substantially reducing the lifetime of the device. Reduction of permeation thus increases the lifetime of the device. In LEDs, the problem is so severe that usually getter material is provided to getter any permeating gases. In liquid crystal display devices, permeated gases are believed to be the cause of the creation of bubbles in the LCD material, which is especially a problem in bendable display devices, where these bubbles occur more often and in which there is a greater risk of the bubbles accumulating.

The inventor has realized that the use of spacers in the seal is less suitable at such seal thicknesses because the stresses exerted on the substrates, especially when bending the device, can run up to a very high level, which can produce failure of functional layers and/or the rheological properties of the seal material during manufacture of the seal. The presence of spacers has a negative effect, which may lead to holes and cracks in the seal. Preferably, the seal line therefore does not comprise spacers.

The seal line (also called 'the seal' in this application) and the active area are preferably separated by an inactive zone, which has a minimum width of less than 3 mm. The flexibility of the substrates allows a relatively small inactive zone of less than 3 mm. Much larger inactive zones are customary for glass substrates. The small inactive zone increases the percentage of active area in relation to the overall size of the device. The minimum width is preferably more than 0.5 mm. The inactive zone also functions as a buffer zone in which material can be buffered. Such a buffer zone provides the capacity of expansion of the LCD material so as to compensate for temperature changes.

The inactive zone preferably comprises spacers having a height which is smaller than the average height of the spacers at the active area and is larger than the seal height.

This reduces the risk of cracking of the functional layers.

In such embodiments, the spacer height in the inactive zone preferably diminishes from the active area to the seal.

The diminishing from the active area to the seal further limits the bending of the substrates and thus further reduces the risk of cracking of the functional layers.

The seal is preferably at least partly made of a metal. A metal has a very low permeability to water and oxygen.

Thin metal layers can be applied at the position of the seal on both substrates, outside the region of electrical contact.

The layers can be made to form a (hermetic) seal by means of e.g. pressure bonding, soldering, laser welding or ultrasonic welding.

BRIEF DESCRIPTION OF THE DRAWINGS

These and other aspects of the invention are apparent from and will be elucidated with reference to the embodiments described hereinafter.

In the drawings.

The Figures are not drawn to scale. In general, like reference numerals refer to like parts.

DETAILED DESCRIPTION OF PREFERRED EMBODIMENTS

Figure 1:
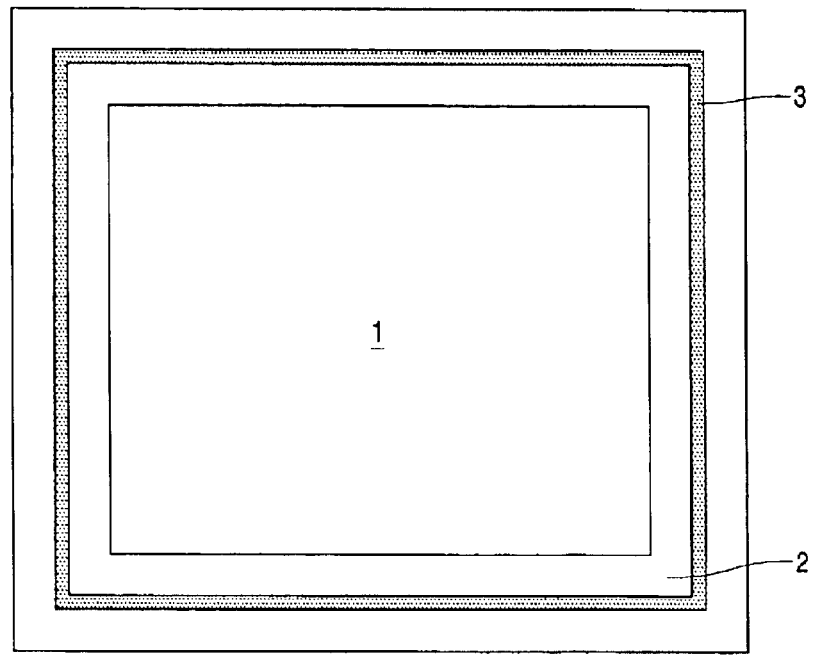
FIGS. 1 and 2 illustrate a conventional LCD display device.
Figure 2:
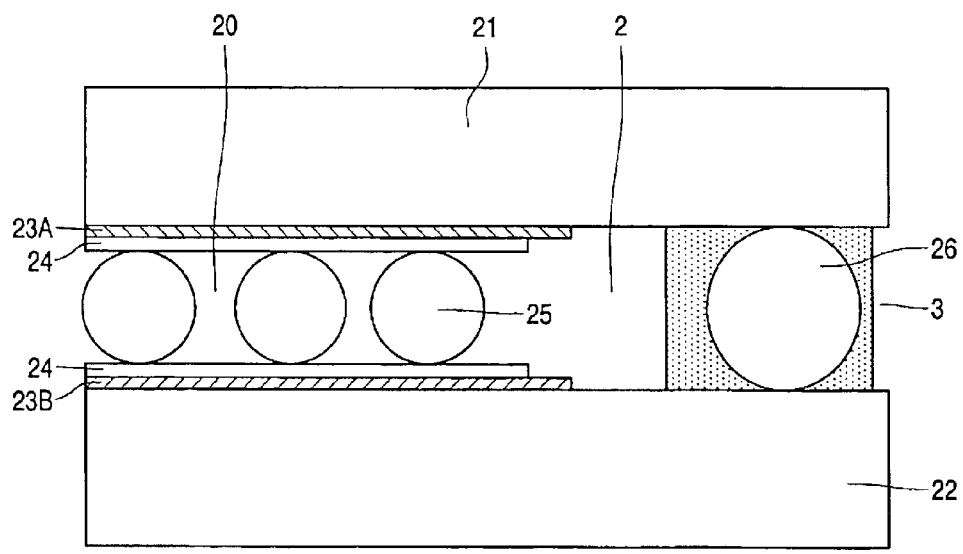

Referring to FIGS. 1 and 2, a known conventional display device, in this example a liquid crystal display device comprises an active area 1, an inactive zone 2 and a seal 3. The device is in the form of a panel comprising two generally rectangular substrates 21 and 22 arranged parallel to each other to define a gap accommodating a liquid crystal material 20. The display shows an active area The substrates are bonded together around their periphery by means of a seal 3 which constrains the liquid crystal material. Spacing elements 25 are provided between the substrates 21 and 22 at the active area 1 so as to maintain the desired spacing between the substrates at said active area, which spacing is referred to as gap.

The inner surfaces of the substrates are provided with electrodes to which drive voltages are provided in order to produce the desired effects. The device may comprise an active matrix device. The substrate 22 carries a row and column matrix of pixel electrodes, which may be formed of ITO or a reflective metal depending on whether the display is to be operated in a transmissive or a reflective mode, which define a display area via thin-film transistors that are connected to sets of row and column address electrodes in the form of conductive lines or tracks which are also present on the substrate 22 internally of the seal region. In this example, the inner surface of the other substrate is provided with a continuous electrode which is common to all pixels and is held at a reference potential. Each display pixel consists of a pixel electrode, an overlying portion of this common electrode and LC material inbetween. The voltage supplied to the pixel electrode determines the gray-scale output. LC orientation layers are provided on the electrode structures on both substrates in known manner and polarizing layers may be provided on their outer surfaces.

In the cross-sectional view of FIG. 2, a row address electrode is shown at 23A while the common electrode 23B on the other substrate is also shown. The orientation layers, for example of polyimide, are shown at 24 while the polarizing layers have been omitted for the sake of simplicity. For a color display, an array of color filter elements would normally also be provided on the substrate 21, but could instead be provided on the substrate 22. At least some of these functional layers usually extend under the seal 3, although this is not shown in FIG. 2. The seal 3 has substantially the same height as the spacing between the substrates at the active area. To this end, the seal comprises spacers 26. Slight differences (up to approximately a few tenths of a micrometer for typically a gap of 6 micrometer) are known in height of the seal versus the gap and/or in difference of diameters of the spacers 25 and 26, so as to take the thickness of the functional layers 23, 24 into account or for optical reasons, namely to reduce the visibility of the inactive zone. Although this set-up works satisfactorily for glass substrates, the inventor has realized that problems arise when using flexible substrates. The shape of the contact area between the spacers 25 and the substrates 21, 22 leads to a number of problems. The flexible substrate folds itself relatively easily around the spacer, leading to a relatively large variation of the gap and also to relatively large stresses in the functional layers which have to follow the shape of the substrate. This requires a large spacer density to be provided for a substantially constant gap. The inventor has found that the spacers tend to agglomerate at such densities, which leads to an increase of the gap variation.

Figure 3:
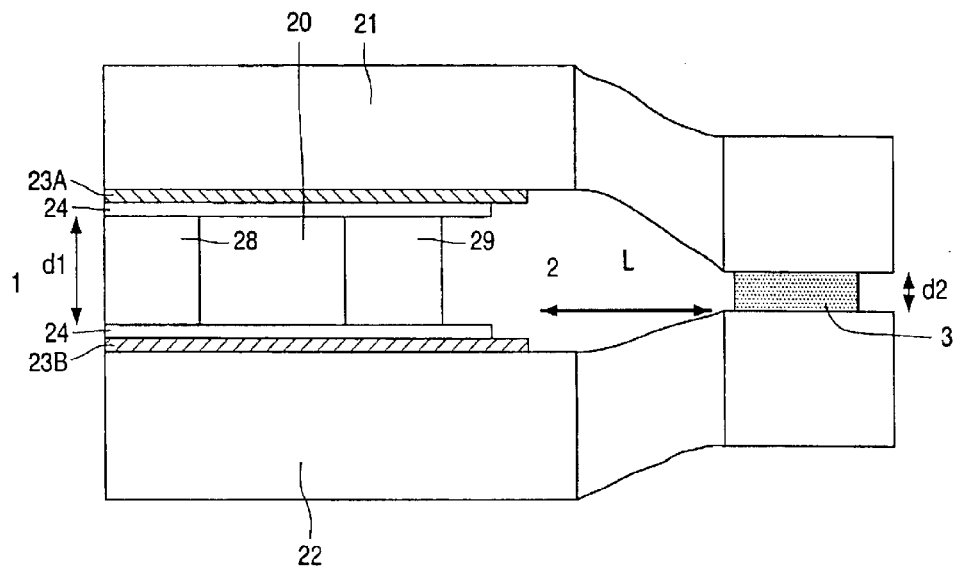
FIG. 3 illustrates a device according to the invention.

FIG. 3 illustrates the invention in which, instead of the conventional spacers, rib or column spacers 28, 29 are used, i.e. spacers with a substantially flat upper and lower side. The supportive effect of such spacers is larger, so that a much smaller spacer density (roughly an order of magnitude less) is needed. Due to their form, agglomeration is also less of a problem. The column or rib spacers are preferably attached at one side to one of the substrates, in which case agglomeration cannot occur. Column spacers are basically spacers which are substantially shaped as columns (which could have a substantially round, rounded or substantially rectangular cross-section). Rib spacers are spacers forming ribs, i.e. they are substantially rectangular but have one longitudinal dimension (length) along the plane of the substrates which is substantially larger than the width. The stresses applied to the functional layers also lead less to a reduced risk of cracking of the functional layers. The seal height $d_2$ is less than 25% of the gap $d_1$. This leads to a strong reduction of permeation of gases such as water or oxygen through the seal, increasing the lifetime of the device. In this preferred embodiment, the spacers do not extend through the seal, because the rheological properties of the sealing material would be too much affected at these small thicknesses. The rib or column spacers would force the sealing material to flow in preferential directions instead of flowing out in all directions. Such preferential flow patterns could lead to weak spots in the seal. The sealing material itself neither comprises spacers for the same reasons. The inactive zone 2 has a width 1, with a minimum of preferably less than 3 mm and preferably more than 0.5 mm.

Figure 4:
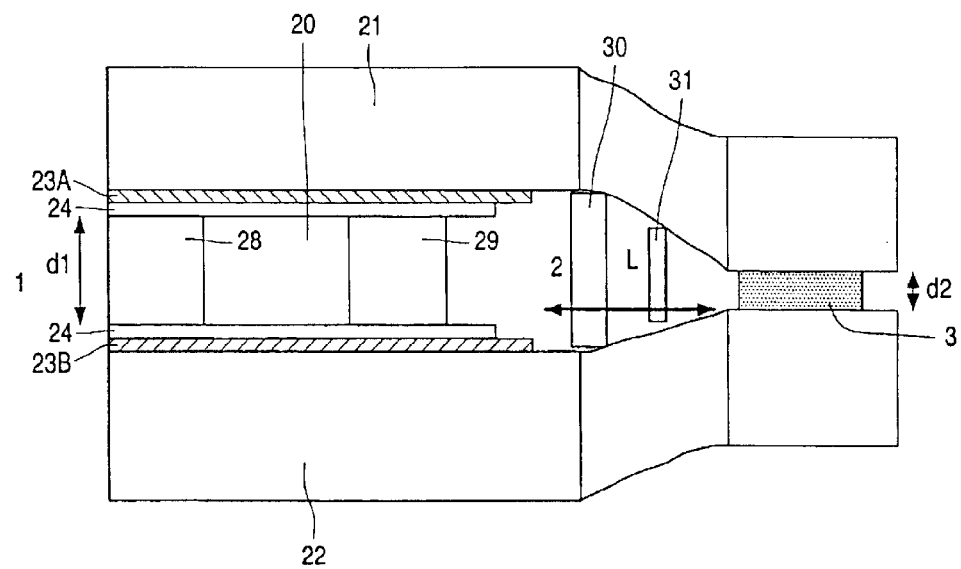
FIG. 4 illustrates a preferred embodiment of the device according to the invention.

FIG. 4 shows a preferred embodiment in which spacers 30 and 31 having a diminishing height are provided in the inactive zone, i.e. there are at least two spacers between the active area and the seal, the height of which spacers ranges between the height of the active area and the height of the seal, the spacer nearest the active area having a height larger than the spacer nearest the seal (or in other words $d_1 < d_{30} < d_{31} < d_2$). Such spacers support the functional layers and the substrates in the inactive zone, i.e. in the region where the gap is reduced, which leads to a reduced risk of cracks in the functional layers.

The use of a seal material with a low permeability further improves the device according to the invention. A metal has a low permeability. The layers are used to make a hermetic seal by means of techniques such as, for instance, pressure bonding and soldering. Electrically conducting layers pass the seal in a functional LCD cell. Where the electric contacts pass under the seal, an insulating seal material is used. The total length of this insulating material is, however, significantly shorter than that of the total seal.

It will be clear that many variations are possible within the scope of the invention.

In summary, the invention can be described as follows.

A display device comprises a pair of plastic substrates (21, 22) which are bonded together by a peripheral seal (3), and comprises cell spacers (28, 29) to space the plastic substrates apart at an active area. At least one of the substrates is provided with a functional layer (23A, 23B, 24), while an electro-optical material is present between the substrates. The spacers (28, 29) are in the form of ribs or columns, i.e. they have substantially flat contact surfaces, and the seal line has a height ($d_2$) of less than ¼ of the height ($d_1$) of the spacers ($d_2 \leq 0.25 d_1$). The seal line preferably does not comprise spacers.

The display device may be, for instance, a LED display device or a liquid crystal display device.

What is claimed is:

1. A display device comprising a pair of plastic substrates (21, 22) which are bonded together by a peripheral seal (3), and comprises cell spacers (28, 29) to space the plastic substrates apart at an active area, at least one of the substrates being provided with a functional layer (23A, 23B, 24), while an electro-optical material is present between the substrates, characterized in that the spacers are in the form of ribs or columns (28, 29), and the peripheral seal (3) has a height (d2) of less than ¼ of the height (d1) of the spacers (d2≦0.25d1).

2. A display device as claimed in claim 1, characterized in that the peripheral seal (3) does not comprise spacers.

3. A display device as claimed in claim 1, characterized in that the peripheral seal (3) and the active area are separated by an inactive zone, which has a minimum width (l) of less than 3 mm.

4. A display device as claimed in claim 3, characterized in that the inactive zone has a minimum width (l) of more than 0.5 mm.

5. A display device as claimed in claim 1, characterized in that the peripheral seal (3) and the active area are separated by an inactive zone (2), and the inactive zone comprises spacers (30, 31) having a height which is smaller than the average height of the spacers at the active area and is larger than the seal height.

6. A display device as claimed in claim 5, characterized in that the spacers (30, 31) in the inactive zone (2) have a height which diminishes from the active area to the seal.

7. A display device as claimed in claim 1, characterized in that the peripheral seal (3) is at least partly made of a metal.

8. A method of providing a display device as claimed in claim 7, characterized in that the peripheral seal (3) is made by means of pressure bonding, soldering, laser welding or ultrasonic welding.

9. A display device as claimed in claim 1, characterized in that the display device is a liquid crystal display device.

* * * * *